Patented Sept. 11, 1951

2,567,592

UNITED STATES PATENT OFFICE 2,567,592

PROCESS OF MOLDING ZIRCONIA

Archibald H. Ballard, Niagara Falls, Ontario, Canada, assignor to Norton Company, Worcester, Mass., a corporation of Massachusetts No Drawing. Application December 19, 1950, Serial No. 201,707

1 Claim. (Cl. 25—156)

The invention relates to the molding of zirconia otherwise called zirconium oxide of the stabilized variety. This application is a continuation in part of my copending application Serial No. 728,198, filed February 12, 1947, now Patent No. 2,538,959.

One of the objects of the invention is to provide a process of molding zirconia to produce pieces of high density, close to the real density. Another object is to provide a process which will give a high yield, that is to say, few rejected pieces. Another object is to provide for the production of pieces to exact shape according to the mold. Another object is to provide a process for molding zirconia in a pressure molding furnace such as disclosed by the U. S. patent to Ridgway No. 2,125,588 with little or no reduction. Another object is to improve the process of making bodies from zirconia according to U. S. patent to Ridgway No. 2,091,569. Another object is to increase production of articles molded from zirconia. Another object is to improve the quality of pieces molded from zirconia. Another object is to produce pieces of high dimensional accuracy. Other objects are to produce articles of stabilized zirconia of excellent quality and by means of a facile process.

Other objects will be in part obvious or in part pointed out hereinafter.

According to the invention I provide a mixture of powders of zirconia, $ZrO_2$ and lime, CaO. Both materials are preferably relatively pure but there is a variety of zirconia containing about 4%, more or less, of silica, and this material can be readily molded in accordance with the present invention. Hafnia is chemically indistinguishable from zirconia and is reported as zirconia. Materials other than zirconia, hafnia, silica and lime should not be present to the extent of more than 2% of the mixture. In case the zirconia contains silica, this may be present to the extent of up to 5% of the $ZrO_2$. The amount of lime should be from one percent, which is the least amount that can be considered significant, up to six percent of the amount of $ZrO_2$ in the powders, but to produce articles of well stabilized zirconia, lime should be provided to the extent of at least three percent of the amount of $ZrO_2$ in the powders.

Each of the zirconia and the lime should be calcined material of fine crystalline structure without recrystallization. This physical condition is sometimes referred to as micro-crystalline and used to be referred to as "amorphous," although that word is not now used for such calcined materials since they are recognized to have a micro-crystalline structure. Thus I use calcined zirconia and calcined lime which have neither of them been fused or heat treated at temperatures high enough to produce recrystallization. The zirconia powder should have been calcined at temperatures not higher than 1200° C. The lime powder should have been calcined at temperatures not higher than 1000° C. However in each case the temperature of calcination should be high enough to drive off nearly all water, water of crystallization, or products of decomposition, such as carbon dioxide.

The following is a table of typical calcining chemical reactions which will produce material suitable for use in this invention:

Table I

| Oxide | Calcining Reaction |
|---|---|
| Zirconia | $Zr(OH)_4 \xrightarrow{1000°\ C.} ZrO_2 + 2H_2O$ |
| Lime | $CaCO_3 \xrightarrow{800°\ C.} CaO + CO_2$ |

The process of this invention involves recrystallization under pressure in contra distinction to what is commonly known as vitrification which involves a fluxing, or melting of one or more of the constituent oxides. In the indicated amounts the lime goes into solid solution in the zirconia crystals.

I provide a refractory mold, including one or more mold plungers. Preferably the mold is made of graphite which is a most satisfactory material because it is refractory and is easily machinable. However other materials can be used such as titanium carbide, TiC, zirconium carbide, ZrC, tungsten carbide, WC or vanadium carbide, VC.

I further provide a pressure-sintering furnace, which may be an induction furnace with pressure plungers or a resistor tube furnace such as disclosed in the aforementioned patent to Ridgway No. 2,125,588. In fact any type of furnace which will heat the contents of a graphite mold, which furnace is also provided with means to exert pressure on the contents of the mold, may be used.

I have discovered that the objects of the invention can be achieved if the zirconia and the lime are in the form of very fine particles, that is the major portion of the material being of 10 microns or less in particle size, and 98% of the material consisting of particles none of which is larger than 50 microns.

The powders of zirconia and lime, of the particle sizes and in the amounts above specified, are thoroughly mixed and the mixture is then packed in the aforesaid mold of graphite or other refractory material, and the mold is then placed in a suitable furnace, for example in a furnace constructed according to the aforesaid Ridgway Patent No. 2,125,588 (hereinafter referred to as a Ridgway furnace). If a Ridgway furnace is used, the mold is placed in the graphite furnace tube 50, the furnace plungers 136 and 173 are then placed in position, the electric current is turned on and eventually the air pressure valves are opened to apply pressure on the mold (see Patent No. 2,125,588).

An important feature of the present invention is the use of relatively low temperatures, that is several hundred degrees below the fusing point of the oxide, contrary to Ridgway Patent No. 2,091,569 wherein a temperature close to the melting point of the oxide is advised.

The preferred temperature of molding is about 1850° C. and the range of temperatures which can be used according to this invention is from 1500° C. to 2200° C. The melting point of pure zirconia, $ZrO_2$, is 2700° C. and the melting points of the zirconia-lime system, up to 6% of lime with $ZrO_2$, are as follows according to the Journal of the American Ceramic Society:

Table II

| Zirconia and Lime Combination | Melting Point |
|---|---|
| | °C. |
| $ZrO_2$+.25% CaO on the $ZrO_2$ | 2698 |
| $ZrO_2$+.50% CaO on the $ZrO_2$ | 2695 |
| $ZrO_2$+1.00% CaO on the $ZrO_2$ | 2690 |
| $ZrO_2$+2.00% CaO on the $ZrO_2$ | 2680 |
| $ZrO_2$+3.00% CaO on the $ZrO_2$ | 2670 |
| $ZrO_2$+4.00% CaO on the $ZrO_2$ | 2660 |
| $ZrO_2$+5.00% CaO on the $ZrO_2$ | 2650 |
| $ZrO_2$+6.00% CaO on the $ZrO_2$ | 2635 |

When articles are molded out of zirconia and lime of the particle sizes specified herein, at temperatures as specified above and at pressures stated hereinafter, homogeneous pieces of almost theoretical density are produced. Furthermore the surfaces of these articles are free from any apparent reaction of the zirconia or lime with the graphite of the mold, that is to say there has been no reduction even on a surface layer. The articles are not spalled even though they have sharp dihedral polyhedral and/or reentrant angles, and the articles can have ribs and grooves and can be made into many complicated shapes to high dimensional accuracy, i. e. as good as the mold. Because of the high density of these articles they are gas tight under a vacuum of as low as one micron of mercury. The articles are substantially integral pieces of zirconia, $ZrO_2$, with lime, CaO, in solid solution in the crystals thereof, in multi-crystalline form with sufficient crystalline growth so that the articles have great strength. They fracture with a conchoidal fracture.

The real density of $ZrO_2$+5.00% CaO on the $ZrO_2$ is 5.78. I have made pieces according to the invention, with 5% of lime on the $ZrO_2$, having a density of 5.68. This result can readily be duplicated in practice.

The mold pressure is preferably as high as the graphite mold will stand, and in any event, 500 pounds to the square inch or more. For most shapes a graphite mold can be made that will withstand 2500 pounds per square inch. I pre- fer to use this higher pressure, and in many cases I use even higher pressure whenever the design of the mold is such that it will withstand such higher pressure. All figures mentioned are top pressures and the pressure should gradually rise thereto.

During the hot molding described the lime goes into solid solution in the zirconia and the zirconia recrystallizes in the cubic system. If not more than 6% of lime on the amount of $ZrO_2$ is used, practically all of the lime CaO goes into solid solution in the zirconia and practically all of the zirconia recrystallizes in the cubic system. This is surprising because the temperatures used, as hereinbefore stated, are far below the melting points of zirconia and lime, 2700° C. and 2572° respectively. If as much as 3% of lime in the amount of $ZrO_2$ is present, approximately 50% of the zirconia will recrystallize in the cubic system. Lesser amounts of lime will cause lesser percentages of the zirconia to recrystallize in the cubic system. In any case the zirconia crystals which are not cubic will be monoclinic, which is the crystal habit of baddeleyite (the mineral designation for $ZrO_2$).

Baddeleyite or monoclinic zirconia produced in the electric furnace when made into refractory articles such as bricks and other shapes, spalls, checks, crazes, or fractures when used in high temperature furnaces. This is because monoclinic zirconia passes through a phase change or inversion at a temperature of about 1250° C. The cubic zirconia does not undergo any phase change or inversion at any temperature up to the melting point. However, the coefficient of expansion of cubic zirconia is higher than that of monoclinic zirconia so therefore, for certain products, a mixture of the cubic and monoclinic forms is preferred and in general there should be at least 50% cubic zirconia in the product. However, for other uses, 100% cubic zirconia is preferred, and on the other hand, for certain purposes a minor percent of the cubic zirconia in predominantly monoclinic zirconia gives the best results. One percent of lime on the $ZrO_2$ will give this latter product. Such a product containing only one percent of lime on the $ZrO_2$ is useful where a low coefficient of expansion is wanted and the article is heated to a high temperature but is never cooled during its useful life. The cubic zirconia makes a stronger product than the monoclinic zirconia, so therefore the entire range between 1% and 6% of lime on the $ZrO_2$ has combinations of properties that are desirable and for different uses different proportions within the range will be found to be superior. It is possible by using the process of this invention not only to produce exact shapes according to the shapes of the molds, but also to achieve great dimensional accuracy.

It will thus be seen that there has been provided by this invention a process for the molding of zirconia in which the various objects hereinbefore given together with many thoroughly practical advantages are successfully achieved. As various other embodiments might be made of the above invention and as the art herein described might be varied in various parts, all without departing from the scope of the invention, it is to be understood that all matter hereinbefore set forth is to be interpreted as illustrative and not in a limiting sense.

I claim:

The process of molding a homogeneous, dense, integral article of zirconia and lime which comprises providing a refractory mold including a hollow mold body and at least one mold plunger, providing a quantity of powder of zirconia $ZrO_2$ of fine crystalline structure which has been obtained by calcination at a temperature not higher than 1200° C. and which has not been recrystallized, providing a powder of lime CaO in the amount of from 1% to 6% of the $ZrO_2$ in the powder of zirconia and which powder of lime CaO is also of fine crystalline structure which has been obtained by calcination at a temperature not higher than 1000° C. and which has not been recrystallized, the major portion of both powders being of particle size not greater than 12 microns and 98% of both powders being of particles none of which is larger than 50 microns particle size, thoroughly mixing said powders, placing a quantity of the mixture in a mold and said mold in a furnace with pressure apparatus, and heating while pressing to a temperature and pressure which rise to between 1500° C. and 2200° C. and to at least 500 lbs. per square inch.

ARCHIBALD H. BALLARD.

No references cited.

Certificate of Correction

Patent No. 2,567,592 September 11, 1951

ARCHIBALD H. BALLARD

It is hereby certified that error appears in the printed specification of the above numbered patent requiring correction as follows:

Column 6, line 2, for "12 microns" read *10 microns*;

and that the said Letters Patent should be read as corrected above, so that the same may conform to the record of the case in the Patent Office.

Signed and sealed this 1st day of January, A. D. 1952.

[SEAL]

THOMAS F. MURPHY,
*Assistant Commissioner of Patents.*